(12) United States Patent
Holdman et al.

(10) Patent No.: US 7,302,540 B1
(45) Date of Patent: Nov. 27, 2007

(54) VIRTUAL TAPE STORAGE SYSTEM HAVING SNAPSHOT VIRTUAL TAPE LIBRARY FOR DISASTER RECOVERY TESTING

(75) Inventors: Jon Mark Holdman, Wheat Ridge, CO (US); Ravi Kumar Kavuri, Inver Grove Heights, MN (US); Nancy L. Rassbach, Westminster, CO (US); Scott Cary Hammett, Golden, CO (US); George Thomas Ward, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 209 days.

(21) Appl. No.: 11/190,039

(22) Filed: Jul. 26, 2005

(51) Int. Cl.
*G06F 12/00* (2006.01)
(52) U.S. Cl. ...................... 711/162; 711/112
(58) Field of Classification Search ................. 711/162, 711/112
See application file for complete search history.

(56) References Cited

U.S. PATENT DOCUMENTS

| | | | |
|---|---|---|---|
| 6,330,621 B1 | 12/2001 | Bakke et al. | |
| 6,434,681 B1 | 8/2002 | Armangau | |
| 6,594,744 B1 | 7/2003 | Humlicek et al. | |
| 6,779,077 B1 | 8/2004 | Bakke et al. | |
| 6,816,957 B1 | 11/2004 | Halladay et al. | |
| 6,842,841 B1 | 1/2005 | Kuik et al. | |
| 2005/0138312 A1* | 6/2005 | Kubo et al. | 711/162 |
| 2006/0200623 A1* | 9/2006 | Gonzalez et al. | 711/111 |

* cited by examiner

*Primary Examiner*—Reba I. Elmore
(74) *Attorney, Agent, or Firm*—Brooks Kushman P.C.

(57) ABSTRACT

A virtual tape storage system includes an original virtual tape library for storing data and includes snapshot virtual tape library (SVTL). The SVTL includes a snapshot of the data stored in the original virtual tape library. A host is operable to receive the snapshot data from the SVTL to perform a disaster recovery test of the original virtual tape library. The SVTL is generated from the original virtual tape library using a copy-on-write snapshot process. In an embodiment, the original virtual tape library stores the stored data on a number of virtual tape volumes (VTVs), and the SVTL includes a snapshot of those VTDs and VTVs which are required for a disaster recovery test of the original virtual tape library. In this case, the host uses the SVTL to perform the disaster recovery test of the original virtual tape library.

15 Claims, 3 Drawing Sheets

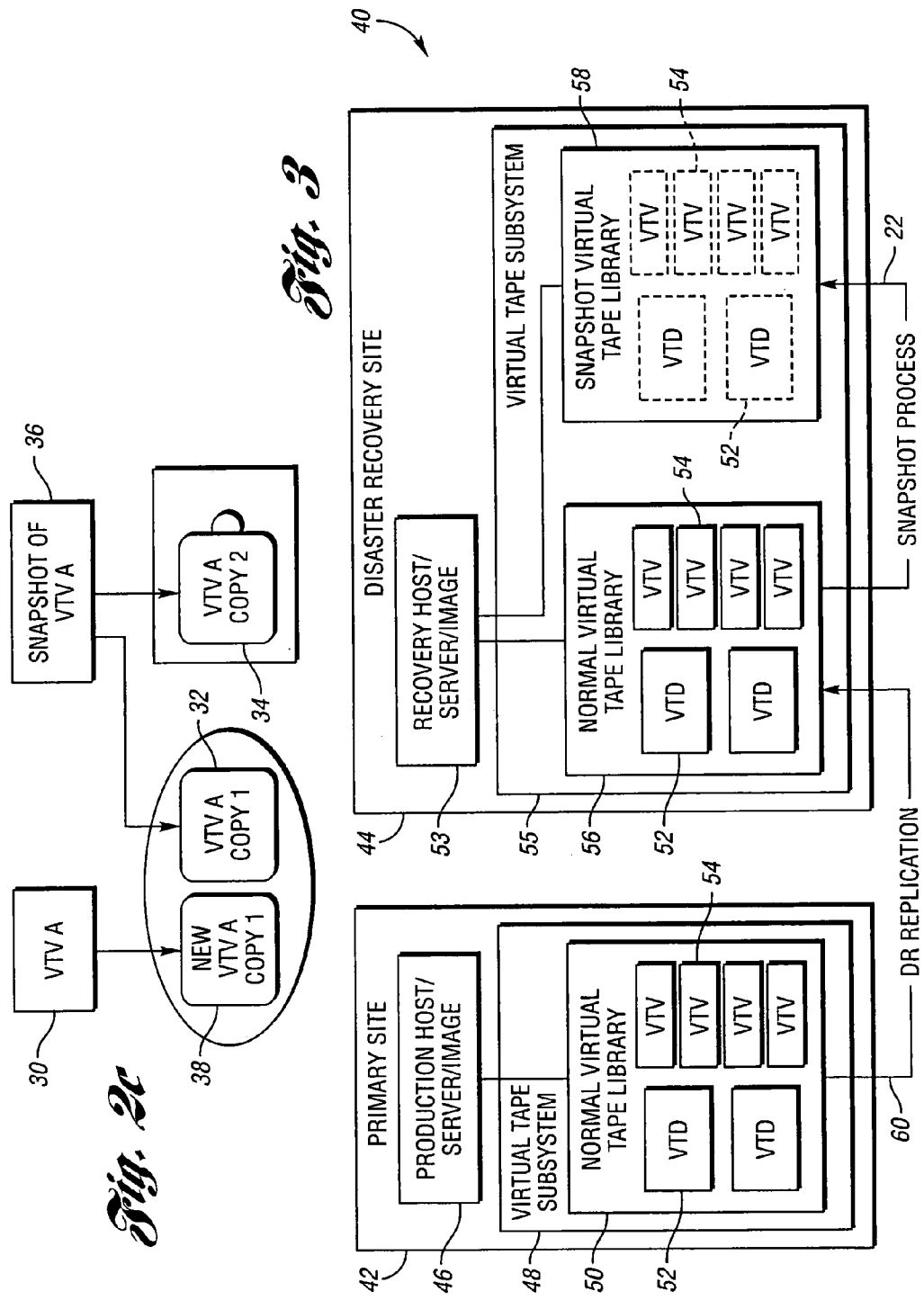

VIRTUAL TAPE STORAGE SYSTEM HAVING SNAPSHOT VIRTUAL TAPE LIBRARY FOR DISASTER RECOVERY TESTING

BACKGROUND OF THE INVENTION

1. Field of the Invention

The present invention generally relates to virtual tape libraries.

2. Background Art

Disaster recovery procedures for data storage applications require periodic testing to determine their effectiveness. When real tape libraries and real tapes are used, testing the disaster recovery procedures requires either that an additional set of tapes be created specifically for use in the testing or that the actual disaster recovery tapes are removed from their normal location for use in the testing.

Disaster recovery tapes are frequently created for a data storage enterprise. The disaster recovery tapes are used to recover the enterprise if a disaster occurs. The disaster recovery tapes are typically moved to an offsite location, either physically or electronically. The offsite location may be a recovery location equipped with servers and other infrastructure required to recover the enterprise using the disaster recovery tapes. Alternatively, the offsite location may be a safe storage location and the disaster recovery tapes are moved from the safe storage location to a recovery location during testing or during an actual recovery.

In some cases, as noted above, the disaster recovery tapes that are to be used in an actual disaster recovery are also used in the disaster recovery testing. In this approach, the disaster recovery tapes are removed from their normal locations and procedures for use in the disaster recovery testing. However, this places any potential disaster recovery at risk if a disaster should occur during the disaster recovery testing.

An alternative, as noted above, is to create an additional set of tapes to be used specifically for disaster recovery testing. However, this requires that an additional set of tapes be available for use in the disaster recovery testing and that machine and personnel resources are used to create the extra copy. Batch and backup windows may restrict the time available to create the extra copy.

SUMMARY OF THE INVENTION

Accordingly, it is an object of the present invention to provide a snapshot virtual tape library.

It is another object of the present invention to provide a snapshot virtual tape library which allows a user to test its disaster recovery procedures without manually creating an additional set of disaster recovery test tapes or without disturbing the normal disaster recovery tapes.

It is a further object of the present invention to leverage the copy-on-write snapshot techniques commonly used in disk subsystems to create a snapshot virtual tape library using minimal additional physical storage and without consuming time in creating tape copies.

It is still another object of the present invention to provide a snapshot virtual tape library which can be used as part of the actual disaster recovery procedure.

It is still a further object of the present invention to provide a snapshot virtual tape library which is created from a normal virtual tape library located either at a primary site or at a disaster recovery site.

It is still yet another object of the present invention to provide a snapshot virtual tape library which is used to create the actual disaster recovery tapes.

The present invention provides a snapshot virtual tape library. The snapshot virtual tape library allows an organization to test its disaster recovery procedures without manually creating an additional set of tapes or having to disturb the normal disaster recovery tapes. By leveraging the copy-on-write snapshot technique commonly used in disk subsystems or other such snapshot techniques (such as split mirror), a snapshot virtual tape library can be created with minimal additional physical storage and without consuming time in creating the tape copies. The snapshot virtual tape library can also be used as part of the actual disaster recovery procedure.

The snapshot virtual tape library can be created inside a virtual tape library system. The snapshot virtual tape library is created as a unit, and contains some or all of the virtual tape volumes present in a reference virtual tape library. The newly created virtual tape volumes share the physical storage with the reference virtual tape volumes, unless write operations occur. If a write operation is performed on any virtual tape (either the new virtual tape volume or the original), then a copy of the virtual tape is made at that point. This allows any operation, including writes, to be performed on either the snapshot virtual tape library or the original virtual tape library without interfering with the other one of the two virtual tape libraries.

The snapshot virtual tape library can be left in place as long as space is available. Initially, no additional space is required. Over time, however, additional space is required as write operations occur. If multiple snapshot virtual tape libraries are created, and there is heavy write activity, a significant amount of storage can be consumed. Policies or explicit commands can be used to release the snapshot thereby freeing up unneeded space.

A virtual tape library system often allows sophisticated policies to be applied to virtual tape volumes. These policies can control how many copies of the virtual tape volumes are kept, when these copies are created, and what media is used for each copy. The snapshot virtual tape library can have a simplified policy. The snapshot virtual tape library can be set to keep fewer or only a single copy of the virtual tape volumes. If this is done, then a write operation on the new or original virtual tape volumes results in unnecessary copies being removed.

An advantage of the snapshot virtual tape library is that the snapshot virtual tapes are identical to the original virtual tapes, including the volume serial. Often the applications (backup or otherwise) have indices or catalogs that refer to the original volsers. By presenting backup volumes with the same volsers, this application metadata need not be modified. Because the snapshot virtual tape library can be presented to a standby server in isolation, the duplicate volsers do not cause conflicts with the production systems.

In situations where production (i.e., non-backup) tapes are used, the snapshot virtual tape library can be created from the production virtual tape library. This allows the snapshot virtual tape library to be used without any interruption of the production virtual tapes or libraries or the production servers, images, or logical partitioning (LPAR). The newly created snapshot virtual tape library can be presented to standby servers, images, or LPARs for use in the disaster recovery testing.

In a similar fashion, backup tapes can be used to perform the disaster recovery testing. Conventional backup processes can be used to create system backups. At a point in time when a consistent set of backups has been created the snapshot virtual tape library can be created. Normal backup processing can continue and the snapshot virtual tape library can be used for disaster recovery testing.

By separating the snapshot virtual tape library from the normal virtual tape library, the normal processes can run at the same time as the disaster recovery testing. The snapshot process prevents these functions from interfering with each other.

The snapshot virtual tape library can also be used to create the actual disaster recovery tapes. Once the normal virtual tape library is in an acceptable state to use for disaster recovery, the snapshot virtual tape library can be created. The snapshot virtual tape library can remain unchanged as long as sufficient storage is available to accommodate changes to the normal copies of the virtual tapes. Policies can be applied in the virtual tape library system to create distinct physical copies of the virtual tapes in the snapshot virtual tape library as a background task. This can be used to create a set of tapes at a primary site that will be transported to a remote site (i.e., a disaster recovery site), or can be used to create the tapes directly at a remote site using a wide area network (WAN) link.

The advantages associated with the present invention are numerous. For instance, disaster recovery is a major use of tape and the snapshot virtual tape library in accordance with the present invention offers a significant simplification to the disaster recovery procedures.

The above objects and other objects, features, and advantages of the present invention are readily apparent from the following detailed description when taken in connection with the accompanying drawings.

BRIEF DESCRIPTION OF THE DRAWINGS

FIGS. 2A, 2B, and 2C illustrate the handling of the actual virtual tape volume snapshots in accordance with the present invention;

FIG. 3 illustrates a virtual tape storage system having a snapshot virtual tape library being used in conjunction with a remote replication configuration in accordance with the present invention.

DETAILED DESCRIPTION OF THE PREFERRED EMBODIMENT(S)

Figure 1:
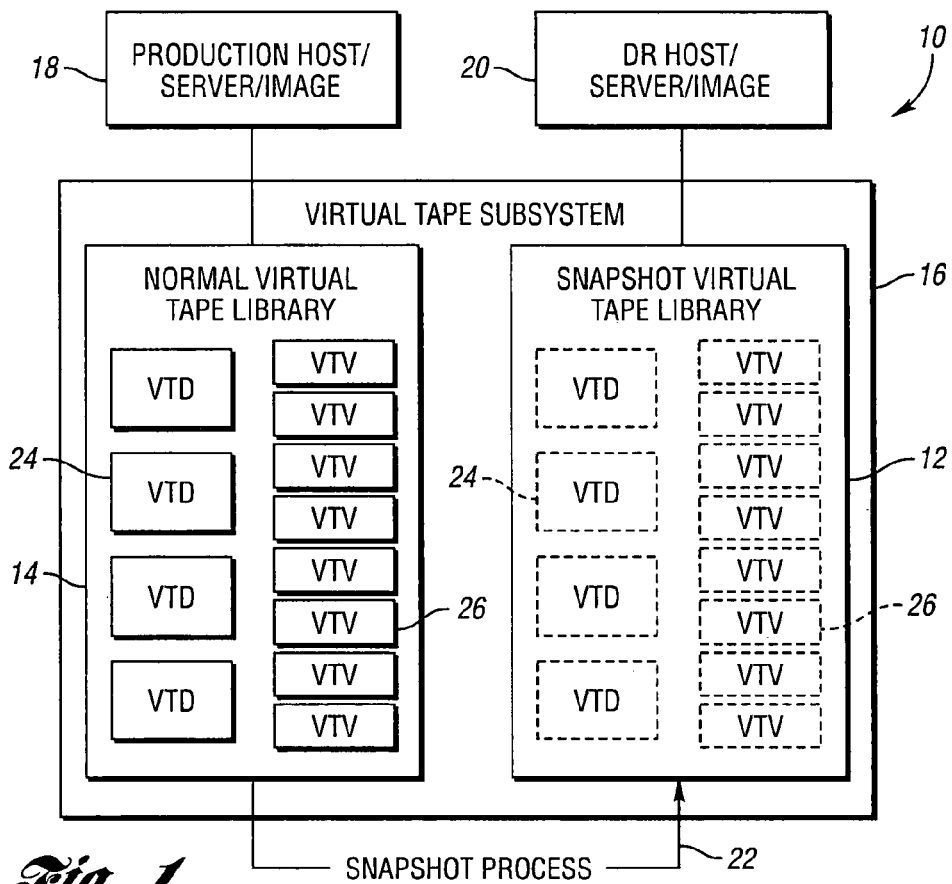
FIG. 1 illustrates a virtual tape storage system having a snapshot virtual tape library created from a normal virtual tape library in accordance with the present invention.

Referring now to FIG. 1, a virtual tape storage system 10 having a snapshot virtual tape library 12 created from a normal virtual tape library 14 in accordance with the present invention is shown. Virtual tape storage system 10 generally includes a virtual tape subsystem 16. Snapshot virtual tape library 12 and normal virtual tape library 14 are associated with virtual tape subsystem 16. Normal virtual tape library 14 stores data on a number a number of virtual tape volumes (VTVs) 26 and provides access to the stored data on a number of virtual tape drives (VTDs) 24.

Virtual tape storage system 10 further includes a production host/server/image ("production host") 18 which is operable to send and receive data from normal virtual tape library 14. Similarly, virtual tape storage system 10 further includes a disaster recovery host/server/image ("disaster recovery host") 20 which is operable to send and receive data from snapshot virtual tape library 12.

As indicated in FIG. 1, snapshot-virtual tape library 12 is created from normal virtual tape library 14 using the copy-on-write snapshot technique (i.e., snapshot process 22) commonly used in disk subsystems. As such, snapshot virtual tape library 12 is an image of normal virtual tape library 14 created instantly at a point in time. That is, snapshot VTDs 24 of snapshot virtual tape library 12 include a snapshot of VTVs 26 of normal virtual tape library 14. As such, other snapshot virtual tape libraries can be created at other points in time such that multiple images of normal virtual tape library 14 for different points in time are created. Snapshot virtual tape library 12 consumes minimal physical capacity by referring to existing data stored by normal virtual tape library 14 rather than duplicating such data. Snapshot virtual tape library 12 appears and functions as a standard virtual tape library enabling it to be used as a backup source, restoration point, information analysis/manipulation base, development environment, and for other applications that benefit from a copy of normal virtual tape library 14. Thus, snapshot virtual tape library 12 appears to disaster recovery host 20 as if it were any other virtual tape library such as normal virtual tape library 14.

While snapshot virtual tape library 12 is shown in FIG. 1 as having the same number of VTDs 24 as original virtual tape library 14, this need not be the case. Because VTDs 24 of snapshot virtual tape library 12 consume real resources (virtual devices) and require configuration on disaster recovery host 20, a smaller number of VTDs may be acceptable. That is, only those VTDs 24 of original virtual tape library 14 that are needed for disaster recovery or for the disaster recovery testing need to be snapshotted as part of snapshot virtual tape library 12. Similarly, while snapshot virtual tape library 12 is shown in FIG. 1 as having the same number of VTVs 26 as original virtual tape library 14, this may also need not be the case. Because VTVs 26 of snapshot virtual tape library 12 also consume real resources and require configuration on disaster recovery host 20, a smaller number of VTVs may be acceptable. That is, only those VTVs 26 of original virtual tape library 14 that are needed for disaster recovery or for the disaster recovery testing need to be snapshotted as part of snapshot virtual tape library 12.

Figure 2A:
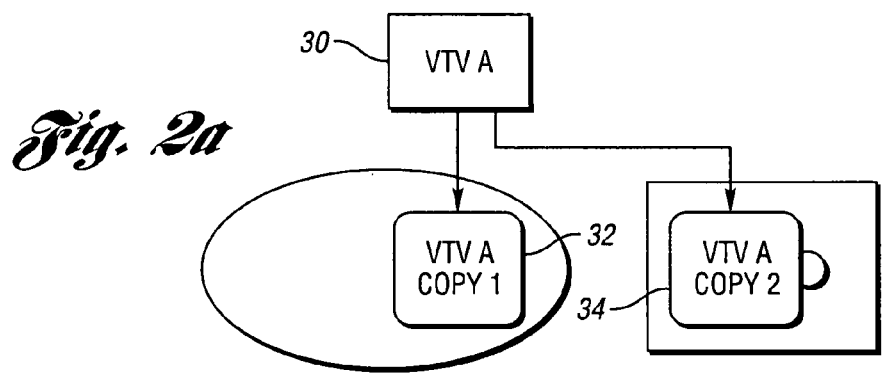
Figure 2B:
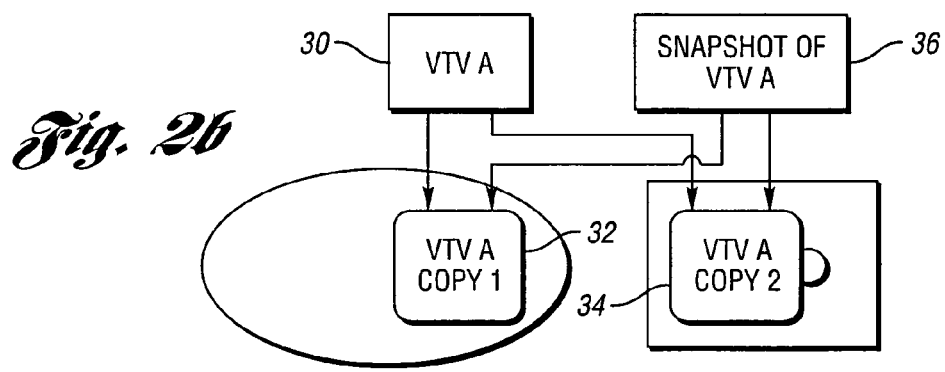

Referring now to FIGS. 2A, 2B, and 2C, with continual reference to FIG. 1, the handling of the actual VTV snapshots in accordance with the present invention is shown. FIG. 2A illustrates the initial configuration of a VTV such as VTV A 30; FIG. 2B illustrates the configuration after a snapshot of VTV A 30 is made; and FIG. 2C illustrates the configuration after a write is performed on VTV A 30.

As shown in FIG. 2A, VTV A 30 has copies on both a tape 32 and a disk volume 34. FIG. 2B illustrates the creation of a snapshot 36 of VTV A 30. At this point, snapshot 36 refers to the same physical storage as the original. After a write operation is performed, a new storage area is used to hold the new copy 38 of VTV A 30. After the write is completed, the usual policy processing of original virtual tape library 14 creates a second copy of VTV A 30 onto a tape. The snapshot library policy is applied to snapshot VTV 36 after the write is completed on the original. In this example, the policy on the original dictates one copy on disk and two copies on tape, whereas the policy for the snapshots indicates only one tape copy.

Referring now to FIG. 3, with continual reference to FIG. 1, a virtual tape storage system 40 having a snapshot virtual tape library being used in conjunction with a remote replication configuration in accordance with the present invention is shown. Virtual tape storage system 40 generally includes a primary site 42 and a disaster recovery site 44. Primary site 42 includes a production host 46 and a virtual tape subsystem 48. Virtual tape subsystem 48 includes a normal virtual tape library 50 having VTDs 52 and VTVs 54. Production host 46 is operable to send and receive data from normal virtual tape library 50.

Disaster recovery site 44 includes a recovery host 53 and a virtual tape subsystem 55. Virtual tape subsystem 55 includes a normal virtual tape library 56 and a snapshot virtual tape library 58. Recovery host 53 is operable to send and receive data from normal virtual tape library 56 and snapshot virtual tape library 58.

In operation, data is replicated from primary site 42 to disaster recovery site 44. More particularly, VTDs 52 and VTVs 54 are replicated from normal virtual tape library 50 of primary site 42 to normal virtual tape library 56 of disaster recovery site 44 using a disaster recovery replication process 60. As such, normal virtual tape library 56 is a full-volume copy of normal virtual tape library 50 (i.e., a clone which results in virtual tape storage system having two separate copies of the normal virtual tape library). If a disaster occurs that disables primary site 42, then recovery host 53, virtual tape subsystem 55, and normal virtual tape library 56 of disaster recovery site 44 could be used to recover the data stored in normal virtual tape library 50 of the primary site.

In order to perform a test of the disaster recovery procedures, snapshot virtual tape library 58 is created. In this embodiment, snapshot virtual tape library 58 is created from normal virtual tape library 56 of disaster recovery site 44 using snapshot process 22. As such, a snapshot of normal virtual tape library 56 is created at disaster recovery site 44. Snapshot virtual tape library 58 appears to disaster recovery host 53 as if it were any other virtual tape library. Snapshot virtual tape library 58 can be made quickly and used without interfering with the ongoing disaster recovery replication process 60. Snapshot virtual tape library 58 can be used to test the disaster recovery procedures. This allows the disaster recovery procedure to be tested just as if a complete second set of tapes had been created.

Figure 4:
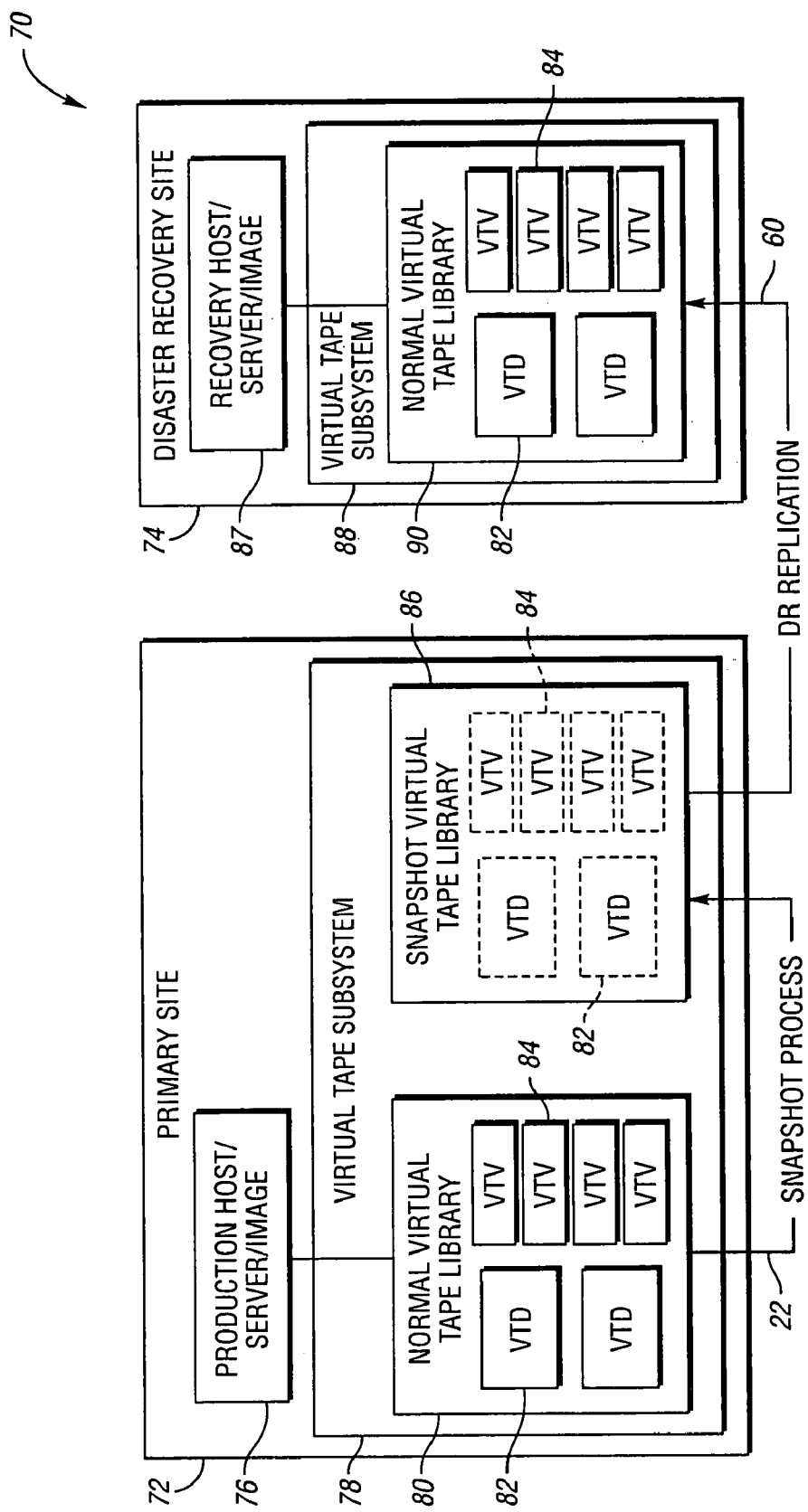
FIG. 4 illustrates a virtual tape storage system having a snapshot virtual tape library being used to create the actual disaster recovery tapes in accordance with the present invention.

Referring now to FIG. 4, with continual reference to FIGS. 1 and 3, a virtual tape storage system 70 having a snapshot virtual tape library being used to create actual disaster recovery tapes in accordance with the present invention is shown. Virtual tape storage system 70 generally includes a primary site 72 and a disaster recovery site 74. Primary site 72 includes a production host 76 and a virtual tape subsystem 78. Virtual tape subsystem 78 includes a normal virtual tape library 80 having VTDs 82 and VTVs 84. Production host 76 is operable to send and receive data from normal virtual tape library 80.

Virtual tape subsystem 78 further includes a snapshot virtual tape library 86. Snapshot virtual tape library 86 is created from normal virtual tape library 80 using snapshot process 22. As such, a snapshot of a production virtual tape library (i.e., normal virtual tape library 80) is created at primary site 72. Snapshot virtual tape library 86 can be used to test the disaster recovery procedures. This allows the disaster recovery procedures to be tested just as if a complete second set of tapes had been created.

Disaster recovery site 74 includes a recovery host 87 and a virtual tape subsystem 88. Virtual tape subsystem 88 includes a normal virtual tape library 90. Recovery host 87 is operable to send and receive data from normal virtual tape library 90. Snapshot virtual tape library 86 appears to disaster recovery site 74 as if it were any other virtual tape library such as normal virtual tape library 80. As such, in operation, disaster replication process 60 can run using snapshot virtual tape library 86 in order to replicate data from primary site 72 to disaster recovery site 74. Production at primary site 72 can continue unaffected using normal virtual tape library 80. This allows the disaster recovery tapes in normal virtual tape library 90 of disaster recovery site 74 to be made from a known point in time. The time to make the remote copy can be adjusted to support a limited bandwidth connection. If a disaster occurs that disables primary site 72, then recovery host 87, virtual tape subsystem 88, and normal virtual tape library 90 of disaster recovery site 74 could be used to recover the data stored in normal virtual tape library 80 located in the primary site.

Thus, it is apparent that there has been provided, in accordance with the present invention, a snapshot virtual tape library that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A virtual tape storage system comprising:
   an original virtual tape library for storing data on a number of virtual tape volumes and for providing access to the stored data via a number of virtual tape drives;
   a production host operable to receive stored data from the original virtual tape library;
   a snapshot virtual tape library generated from the original virtual tape library using a snapshot process such that the snapshot virtual tape library includes snapshot virtual tape drives having snapshot virtual tape volumes which include a snapshot of at least a portion of the virtual tape volumes stored in the original virtual tape library; and
   a disaster recovery host operable to receive the snapshot data from the snapshot virtual tape library to perform a disaster recovery test of the original virtual tape library.

2. The system of claim 1 wherein:
   the snapshot virtual tape library is generated from the original virtual tape library using a copy-on-write snapshot process.

3. The system of claim 1 wherein:
   the snapshot virtual tape library is generated from the original virtual tape library using a split-mirror snapshot process.

4. The system of claim 1 wherein:
   the snapshot of the at least a portion of the virtual tape volumes stored in the original virtual tape library is a snapshot of the at least a portion of the virtual tape volumes stored in the original virtual tape library at a given point in time;
   the system further comprising a second snapshot virtual tape library generated from the original virtual tape library using a snapshot process such that the second snapshot virtual tape library includes snapshot virtual tape drives having snapshot virtual tape volumes which include a snapshot of at least the portion of the virtual tape volumes stored in the original virtual tape library at a subsequent point in time, wherein the disaster recovery host is operable to receive the snapshot data from the second snapshot virtual tape library in order to perform a disaster recovery test of the original virtual tape library.

5. The system of claim 1 wherein:
the snapshot virtual tape volumes of the snapshot virtual tape drives in the snapshot virtual tape library include a snapshot of the virtual tape volumes stored in the original virtual tape library which are required for a disaster recovery test of the original virtual tape library.

6. A virtual tape storage system comprising:
a primary site having an original virtual tape library for storing data on a number of virtual tape volumes and for providing access to the stored data via a number of virtual tape drives; and
a disaster recovery site having a recovery host and a virtual tape subsystem, the virtual tape subsystem having a normal virtual tape library and a snapshot virtual tape library;
wherein the normal virtual tape library stores a copy of the data stored in the original virtual tape library, wherein the snapshot virtual tape library is generated from the normal virtual tape library using a snapshot process such that the snapshot virtual tape library includes snapshot virtual tape drives having snapshot virtual tape volumes which include a snapshot of the data copy stored in the normal virtual tape library;
wherein the recovery host is operable to receive the data copy from the normal virtual tape library, wherein the recovery host is operable to receive the snapshot data from the snapshot virtual tape library to perform a disaster recovery test of either the original virtual tape library or the normal virtual tape library.

7. The system of claim 6 wherein:
the normal virtual tape library receives the data stored in the original virtual tape library via a data replication process between the original virtual tape library and the normal virtual tape library in order for the normal virtual tape library to store the data copy.

8. The system of claim 6 wherein:
the snapshot virtual tape library is generated from the normal virtual tape library using a copy-on-write snapshot process.

9. The system of claim 6 wherein:
the snapshot of the data copy stored in the normal virtual tape library is a snapshot of the data copy stored in the normal virtual tape library at a given point in time;
wherein the virtual tape subsystem of the disaster recovery site further includes a second snapshot virtual tape library generated from the normal virtual tape library using a snapshot process such that the second snapshot virtual tape library includes snapshot virtual tape drives having snapshot virtual tape volumes which include a snapshot of the data copy stored in the normal virtual tape library at a subsequent point in time, wherein the recovery host uses the second snapshot virtual tape library to perform a disaster recovery test of the original virtual tape library.

10. A virtual tape storage system comprising:
a primary site having a production host and a virtual tape subsystem, the virtual tape subsystem having an original virtual tape library for storing data on a number of virtual tape volumes and for providing access to the stored data via a number of virtual tape drives, the virtual tape subsystem further having a snapshot virtual tape library generated from the original virtual tape library using a snapshot process such that the snapshot virtual tape library includes snapshot virtual tape drives having snapshot virtual tape volumes which include a snapshot of the original virtual tape library, the production host being operable to receive stored data from the original virtual tape library; and
a disaster recovery site having a recovery host and a normal virtual tape library, wherein the normal virtual tape library stores a copy of the data stored in the original virtual tape library, the recovery host being operable to receive the data copy from the normal virtual tape library, the recovery host being operable with the snapshot virtual tape library to receive the snapshot to perform a disaster recovery test of the original virtual tape library.

11. The system of claim 10 wherein:
the snapshot is replicated from the snapshot virtual tape library to the normal virtual tape library for the normal virtual tape library to store the copy of the data stored in the original virtual tape library.

12. The system of claim 10 wherein:
the snapshot of the snapshot virtual tape library is generated from the original virtual tape library using a copy-on-write snapshot process.

13. The system of claim 10 wherein:
the snapshot virtual tape library includes a snapshot of the original virtual tape library at a given point in time;
wherein the virtual tape subsystem further includes a second snapshot virtual tape library which includes a snapshot of the original virtual tape library at a subsequent point in time.

14. The system of claim 13 wherein:
the second snapshot virtual tape library is generated from the original virtual tape library using a copy-on-write snapshot process.

15. The system of claim 14 wherein:
the host is operable with the second snapshot virtual tape library to receive the snapshot data from the second snapshot virtual tape library in order to perform a disaster recovery test of the original virtual tape library.

* * * * *